(12) United States Patent
Wakabayashi et al.

(10) Patent No.: US 8,573,361 B2
(45) Date of Patent: Nov. 5, 2013

(54) LUBRICATING STRUCTURE OF A ROTATIONAL SHAFT OIL SEALING PORTION

(75) Inventors: Koji Wakabayashi, Nishio (JP); Shinji Kitaoka, Toukai (JP); Toru Inoue, Obu (JP); Satoshi Munakata, Nishikamo-gun (JP)

(73) Assignees: Aisin Ai Co., Ltd., Nishio-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 1640 days.

(21) Appl. No.: 11/822,851

(22) Filed: Jul. 10, 2007

(65) Prior Publication Data

US 2008/0011115 A1 Jan. 17, 2008

(30) Foreign Application Priority Data

Jul. 12, 2006 (JP) .................................. 2006-191568

(51) Int. Cl.
*F16H 57/04* (2010.01)
*F01M 1/00* (2006.01)

(52) U.S. Cl.
USPC .......................................... 184/6.12; 184/6.8

(58) Field of Classification Search
USPC ............... 184/6.12, 6.28, 27.2, 6.8, 6.26, 7.1; 418/21, 428, 26, 88, 94, 98, 99, 102; 415/26, 113, 110, 111, 112, 229
See application file for complete search history.

(56) References Cited

U.S. PATENT DOCUMENTS

| | | | | | |
|---|---|---|---|---|---|
| 2,484,789 | A | * | 10/1949 | Hill et al. | 418/21 |
| 2,917,634 | A | * | 12/1959 | Barnothy | 250/381 |
| 2,947,290 | A | * | 8/1960 | Froede | 123/203 |
| 3,390,667 | A | * | 7/1968 | Beurtheret | 418/61.3 |
| 4,157,045 | A | * | 6/1979 | Suzuki | 475/160 |

(Continued)

FOREIGN PATENT DOCUMENTS

| JP | 50-142974 U | 11/1975 |
|---|---|---|
| JP | 6-221274 A | 8/1994 |

(Continued)

OTHER PUBLICATIONS

Official Action issued in counterpart Japanese application by the Japanese Patent Office on Jun. 26, 2008, and English language translation of Official Action.

*Primary Examiner* — William A Rivera
*Assistant Examiner* — Henry Liu
(74) *Attorney, Agent, or Firm* — Buchanan Ingersoll & Rooney PC

(57) ABSTRACT

A lubricating structure of a rotational shaft oil sealing portion includes a casing, a rotational shaft rotatably retained by the casing, an annular space defined between the casing and the rotational shaft, an annular oil seal retained by the casing at one axial end of the annular space and sealing a clearance between the casing and the rotational shaft, the annular oil seal defining an oil seal chamber at the other axial end of the annular space, an oil supply passage, an oil drain passage, and an oil groove formed at the inner peripheral wall of the casing by cutting away the inner peripheral wall into a crescent shape in a circumferential direction, the oil supply passage communicating with the oil groove at a circumferentially center portion of the oil groove, wherein pressurized lubricating oil is supplied to the oil groove via the oil supply passage.

6 Claims, 2 Drawing Sheets

(56) References Cited

U.S. PATENT DOCUMENTS

| | | | |
|---|---|---|---|
| 4,453,837 A * | 6/1984 | Shimizu et al. | 384/121 |
| 4,605,101 A * | 8/1986 | Barbeau | 184/6.11 |
| 4,911,119 A * | 3/1990 | Ohno et al. | 123/196 W |
| 5,017,108 A * | 5/1991 | Murayama et al. | 418/55.6 |
| 5,147,015 A * | 9/1992 | Snuttjer et al. | 184/6.22 |
| 5,289,681 A * | 3/1994 | Iwata | 60/428 |
| 5,330,335 A * | 7/1994 | Teracuhi et al. | 418/55.6 |
| 5,499,902 A * | 3/1996 | Rockwood | 415/113 |
| 5,553,586 A * | 9/1996 | Koishikawa et al. | 123/195 P |
| 5,562,182 A * | 10/1996 | Kayukawa et al. | 184/6.17 |
| 6,074,189 A * | 6/2000 | Eckerle | 418/109 |
| 6,174,151 B1 * | 1/2001 | Yarr | 418/171 |
| 6,264,448 B1 * | 7/2001 | Itoh et al. | 418/104 |
| 6,325,603 B1 * | 12/2001 | Moller | 418/86 |
| 6,481,991 B2 * | 11/2002 | Takagi et al. | 418/109 |
| 6,699,017 B2 * | 3/2004 | Murase et al. | 417/222.2 |
| 6,997,285 B2 * | 2/2006 | Downes et al. | 184/19 |
| 7,163,192 B2 * | 1/2007 | Aoki et al. | 251/248 |
| 7,695,260 B2 * | 4/2010 | Holtzapple et al. | 418/104 |
| 2003/0072665 A1 * | 4/2003 | Bachmann et al. | 418/171 |
| 2004/0003968 A1 * | 1/2004 | Rakhmailov | 184/6.11 |
| 2005/0089410 A1 * | 4/2005 | Matsumoto et al. | 417/269 |
| 2006/0039815 A1 * | 2/2006 | Chertok et al. | 418/61.3 |
| 2007/0151222 A1 * | 7/2007 | Iida et al. | 56/157 |
| 2007/0270264 A1 * | 11/2007 | Grunwald et al. | 475/91 |
| 2008/0159885 A1 * | 7/2008 | Kameya et al. | 417/410.4 |
| 2008/0166251 A1 * | 7/2008 | Williamson et al. | 418/19 |
| 2009/0180908 A1 * | 7/2009 | Matsuo et al. | 418/54 |

FOREIGN PATENT DOCUMENTS

| | | |
|---|---|---|
| JP | 07-071612 A | 3/1995 |
| JP | 7-41129 U | 7/1995 |
| JP | 08-200478 A | 8/1996 |
| JP | 9-100900 A | 4/1997 |
| JP | 2003-42273 A | 2/2003 |
| JP | 2003-329116 A | 11/2003 |

* cited by examiner

PRIOR ART

LUBRICATING STRUCTURE OF A ROTATIONAL SHAFT OIL SEALING PORTION

CROSS REFERENCE TO RELATED APPLICATIONS

This application is based on and claims priority under 35 U.S.C §119 with respect to Japanese Patent Application 2006-191568, filed on Jul. 12, 2006, the entire content of which is incorporated herein by reference.

FIELD OF THE INVENTION

This invention relates to a structure of a rotational shaft oil sealing portion used in a transmission or in a transfer apparatus for a vehicle. More specifically, the invention relates to a lubricating structure for supplying lubricating oil.

BACKGROUND

A transmission for a vehicle and a transfer apparatus for a vehicle converts and distributes a rotative power speed input to an input shaft respectively and output the converted or distributed power from an output shaft. A gear mechanism, which is engageably controlled, is usually provided inside of the transmission or inside of the transfer apparatus. In order to prevent wear and overheating of a bearing and of the gear mechanism, lubricating oil is enclosed in a casing of the apparatus to be circulated, and thus each component is lubricated. Also, in order to prevent the lubricating oil from leaking out of the apparatus, oil sealing portions are formed between each rotational shaft and the casing. An oil seal, which mainly composes the oil sealing portion, may be called a seal lip. An annular member made of synthetic rubber, for example, is employed and retained by the casing. The annular member is slidably contacted throughout an entire circumference of the rotational shaft. The oil sealing portion does not necessarily support weight of the rotational shaft, however, it is common to lubricate the oil sealing portion by using the lubricating oil to restrain heat caused by friction and deposits of foreign substances such as sludge.

The applicants of the invention disclose examples of this kind of lubricating structures in JP H7-71612A and JP H8-200478A. The lubricating structure of the oil seal disclosed in JP H7-71612A is provided with an oil seal, bearings, an oil receiver guiding the lubricating oil into a clearance between the oil seal and the bearing, and guide ribs provided at a bottom wall of a mounting hole for the bearing. The oil receiver receives and accumulates the lubricating oil gathered by the gears located inside the apparatus, and the guide ribs guide the lubricating oil to the oil seal. An oil pump is provided in the lubricating structure in the gearing transmission disclosed in JP H8-200478A, and an input shaft serves as a driving shaft of the oil pump and a bearing retainer of a bearing, which supports the input shaft, serves as a housing of the oil pump. The oil pump pumps the lubricating oil, which is guided from an oil receiver, to a pilot bearing between the input shaft and an output shaft.

In the method disclosed in JP H7-71612A, the lubricating oil is accumulated by the oil receiver and is guided by utilizing gravity. Unfortunately, it is difficult to effectively lubricate the oil sealing portion with this method due to hindrance caused by a centrifugal force of the rotational shaft. That is, although the lubricating oil is needed most in the vicinity of a sliding contact portion between a surface of the rotational shaft and the oil seal, the lubricating oil tends to be scattered to an outer side by the centrifugal force. Also, in the method disclosed in JP H8-200478A, the lubricating oil is pumped by the oil pump. The method is preferable for metal portions such as bearings, however, there is concern that direct jetting influences the oil seal made of synthetic rubber. Namely, if the pressurized oil is constantly jetted to a certain portion of the oil seal, fatigue may occur in a part of the oil seal, leading to deformation, or durability decrease. Further, in the known structure, there are cases where all of the lubricating oil is flown out when the apparatus is not operated. In those cases, the lubricating effect is not achieved properly immediately after the start of the operation, and there is room for improvement.

The present invention has been made in view of the above circumstances, and provides a lubricating structure of a rotational shaft oil sealing portion which supplies a sufficient amount of lubricating oil in the vicinity of a sliding contact portion on a surface of the rotational shaft to effectively lubricate therearound and to achieve the proper lubricating effect immediately after the start of the operation without influencing the oil seal in a disadvantageous manner such as fatigue.

SUMMARY OF THE INVENTION

According to an aspect of the present invention, a lubricating structure of a rotational shaft oil sealing portion includes a casing, a rotational shaft rotatably retained by the casing, an annular space defined between the casing and the rotational shaft, an annular oil seal retained by the casing at one axial end of the annular space and sealing a clearance between the casing and the rotational shaft, the annular oil seal defining an oil seal chamber surrounded by the rotational shaft and an inner peripheral wall of the casing at the other axial end of the annular space, an oil supply passage supplying a lubricating oil from the casing to the oil sealing chamber, an oil drain passage draining the lubricating oil to one of the casing and an oil passage formed inside of the rotational shaft from the oil seal chamber, and an oil groove formed at the inner peripheral wall of the casing by cutting away the inner peripheral wall into a crescent shape in a circumferential direction. The oil supply passage communicates with the oil groove at a circumferentially center portion of the oil groove, wherein pressurized lubricating oil is supplied to the oil groove via the oil supply passage.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
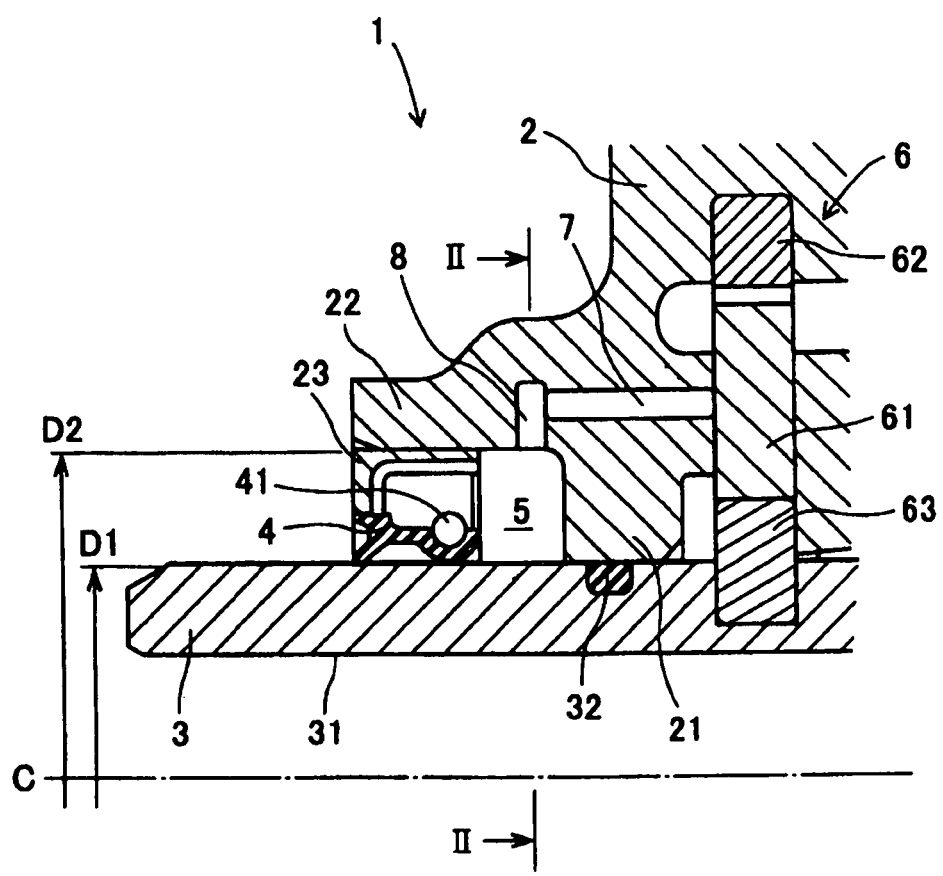
FIG. 1 is a sectional view illustrating a lubricating structure of an input shaft oil sealing portion of a transfer apparatus for a vehicle in an embodiment of the present invention and showing an upper half of a shaft center.
Figure 2:
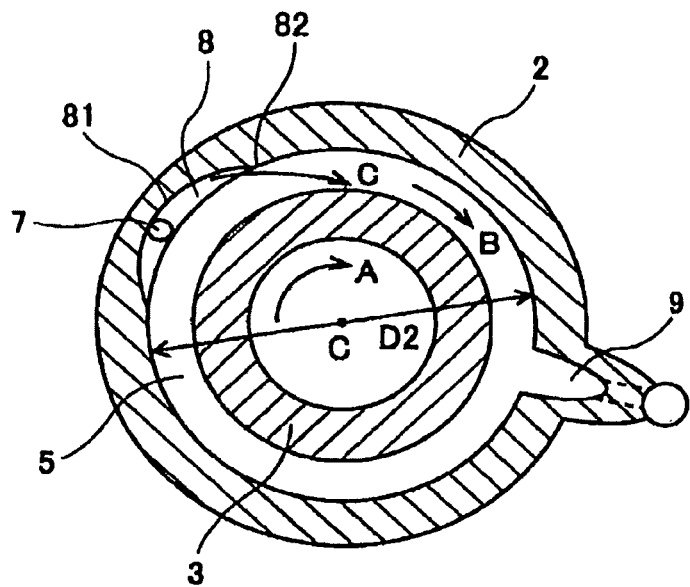
FIG. 2 is a sectional view illustrating an oil sealing chamber viewed from a II-II direction in the embodiment of FIG. 1.
Figure 3:
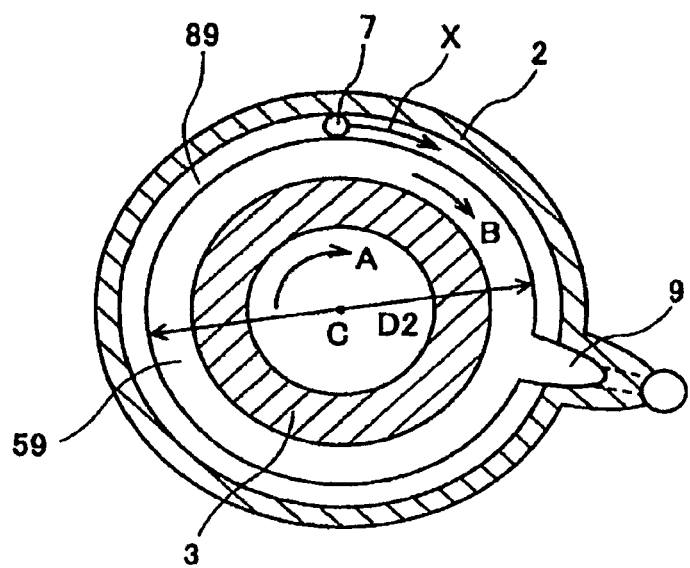
FIG. 3 is a sectional view illustrating a known oil sealing chamber.

An embodiment of the present invention will be described below with reference to FIGS. 1 to 3. FIG. 1 is a sectional view illustrating a lubricating structure of an input shaft oil sealing portion of a transfer apparatus for a vehicle according to the embodiment of the present invention and showing an upper half of a shaft center C. The input shaft oil sealing portion corresponds to a rotational shaft oil sealing portion, and the rotational shaft oil sealing portion indicates a portion formed between a rotational shaft and a casing. Also, a lubricating structure 1 of the embodiment is configured so that an oil seal 4 is disposed in an annular space 5 defined between a pump case 2 and an input shaft 3. The pump case 2 composes a part of the casing and is formed with a trochoid type pump therein.

The input shaft 3 is formed in an approximately cylindrical shape so that an output shaft of the transmission (not shown) can be fitted with an inner circumference surface 31. The input shaft 3 is rotatably retained by the pump case 2 and extends to a right side as viewed in FIG. 1 to be supported by the casing. The right side of the pump case 2 illustrated in FIG. 1 is a small diameter portion 21 of an inner diameter D1, which is substantially the same size with an outer diameter of the input shaft 3 and a large diameter portion 22 of a large inner diameter D2 is located at the left side as viewed in FIG. 1. An annular retaining member 23 is fixedly installed on an inner surface of the large diameter portion 22 to form the annular space 5 with the small diameter portion 21. The oil seal 4 is made of an annular acrylic rubber and is disposed at one axial end of the both axial ends of the annular space 5. More specifically, the oil seal 4 is disposed at the one end of the annular space 5 that faces to an exterior of the apparatus illustrated in the left side of the figure and is retained by the retaining member 23. The oil seal 4 is pressed against the input shaft 3 by a seal presser foot 41 for allowing a slidable contact with the input shaft 3. The seal presser foot 41 is formed by winding a coil spring into an annular shape. Also, a circumferential groove is formed in a portion of an outer circumference of the input shaft 3 which faces the small diameter portion 21, and a seal ring 32 is disposed therein. The annular space 5 is defined by the oil seal 4 and the seal ring 32 so as to form an oil tight structure serving as an oil sealing chamber 5 (the identical reference numeral to the annular space is used).

A trochoid type pump 6 is formed at the small diameter portion 21 of the pump case 2 (serving as the casing). The trochoid type pump 6 is formed by a driving gear 61, which is locked to the input shaft 3 by a locking member 63 and is driven unitary therewith, and a driven gear 62 meshing with the driving gear 61. Further, the trochoid type pump 6 is provided with an oil suction passage (not shown) and an oil supply passage 7. The oil suction passage is in communication with a bottom portion of the casing and the oil supply passage 7 is in communication with the oil sealing chamber 5. In the trochoid type pump 6, when the driving gear 61 meshes with the driven gear 62, spatial volume between teeth changes and the lubricating oil is suctioned from the oil suction passage to be pumped into the oil supply passage 7. The trochoid type pump 6 is also used for pumping the lubricating oil into an inner shaft oil passage (not shown) of the output shaft.

Next, an inner structure of the oil sealing chamber 5 will be described with reference to FIG. 2. FIG. 2 is a sectional view illustrating the oil sealing chamber 5 viewed from a II-II direction of FIG. 1. In FIG. 2, the input shaft 3 rotates in a clockwise direction A. An oil groove 8 is formed in an inclined upper portion which is at a front side of a highest portion of the oil sealing chamber 5 viewed from a rotating direction of the input shaft 3, i.e., a left inclined upper portion of the figure. More specifically, an inner peripheral wall of the large diameter portion 22 of the pump cover 2 defining the oil sealing chamber 5 is cut away to form the oil groove 8. The oil groove 8 is formed to be in a crescent-shape in the circumferential direction and to be in parallel to the oil sealing chamber 5 in a narrower width than that of the oil sealing chamber 5 in the axial direction. Thus, a bottom surface 81 of the oil groove 8 becomes gradually shallow from a center toward both ends and completely matches the inner diameter D2 at an upper end portion 82. The oil supply passage 7, which communicates with the trochoid type pump 6, further communicates with the approximate center of the oil groove 8.

On the other hand, an oil drain passage 9 is provided in the right inclined lower portion of the figure, which is located axisymmetrically relative to the oil supply passage 7 in the oil sealing chamber 5. The oil drain passage 9 is in communication with an inside of the casing.

Next, the operation and effect of the lubricating structure 1 of the embodiment, which is structured as described above, will be described. When the input shaft 3 is rotated, the driving and driven gears 61 and 62 of the trochoid type pump 6 are meshed to rotate. Consequently, the spatial volume between the teeth of the driving and driven gears 61 and 62 changes and the lubricating oil is suctioned from the oil suction passage and is pumped to the oil supply passage 7. The pressurized lubricating oil is jetted out in the vicinity of the center of the crescent-shaped oil groove 8 from the oil supply passage 7. On the other hand, air in the oil sealing chamber 5 is biased by friction that occurs against the input shaft 3 and flows in a clockwise direction B, similarly to the rotational shaft 3. The lubricating oil in the oil groove 8 is biased by the airflow and flows to the upper end portion 82, which is located in the rotational direction, along the bottom surface 81 of the oil groove 8. The lubricating oil comes out from the upper end portion 82 in a tangential direction of the bottom surface 81. Since the oil groove 8 is cut away in the crescent shape, the tangential direction of the bottom surface 81 includes a circumferential component and a component whose direction is toward the shaft center. As illustrated in FIG. 2, the lubricating oil is guided so as to reach a surface of the rotational shaft 3 by a guiding passage C.

Compared with the above-described operation, a flow of the lubricating oil in a known structure which does not have the crescent shaped oil groove or in another known structure which has an entire circumferential oil groove 89 will be described with reference to FIG. 3. FIG. 3 is a sectional view illustrating a known oil sealing chamber 59. In the known structure, an inner peripheral wall of a large diameter portion 22 of a pump cover 2 defining the oil sealing chamber 59 is cut away at a fixed depth around an entire circumference thereof to form the entire circumferential oil groove 89. The oil supply passage 7 communicates with an approximate highest portion of the entire circumferential oil groove 89. In the know lubricating structure, the supplied lubricating oil flows in a pathway X along a bottom surface of the entire circumferential oil groove 89 and the oil is not likely to flow in the direction of the shaft center. Thus, the amount, which reaches the rotational shaft, is limited.

Therefore, in the lubricating structure 1 of the embodiment, it is possible to supply the larger amount of the lubricating oil to the surface of the rotational shaft 3 than the known lubricating structure of the oil sealing portion to lubricate in the vicinity of the sliding contact portion contacted with the oil seal 4. Also, as illustrated in FIG. 2, the lubricating oil flows in a wide angle range of approximately 180 degrees: from the oil supply passage 7 located at the left inclined upper portion to the oil drain passage 9 located at the inclined lower portion which is substantially axisymmetric relative to the oil supply passage 7. Compared with this, as illustrated in FIG. 3, the oil supply passage 7 communicates with the highest portion of the entire circumferential oil groove in the known lubricating structure. Thus, the lubricating effect is achieved in a narrower angle range.

Further, the lubricating oil is accumulated in a position which is located lower than the oil drain passage 9 in the oil sealing chamber 5, and a part of the lubricating oil adheres to the surface of the input shaft 3 to achieve the lubricating effect when the operation is performed. The lubricating oil, which is accumulated when the operation is stopped, adheres to the input shaft 3 at the start of the operation and achieves the lubricating effect.

As illustrated in FIG. 1, the oil seal 4 is provided at one end of the oil seal chamber 5, as is illustrated in the right of the figure, and does not directly face the oil supply passage 7 and the oil groove 8. Thus, the oil seal 4 is not subject to direct jetting of the lubricating oil, and it is possible to avoid deformation due to fatigue and durability decrease.

The invention is applied to transmissions or transfer apparatuses. An input shaft or an output shaft, which is supported by the casing with bearings and the likes, corresponds to a rotational shaft. The annular space is defined between the casing and the rotational shaft by providing a circumferential groove, for example, in the inner peripheral wall of the casing. The annular oil seal is retained by the casing at the one axial end of the both axial ends of the annular space, and the end faces the outer side of the apparatus. Further, an annular elastic member is wound around an outer circumference side of the oil seal, and the oil seal slidably contacts with the rotational shaft being pressed against the rotational shaft. Then, the oil seal defines the oil sealing chamber on the other end of the annular space as well as sealing the clearance between the casing and the rotational shaft.

The oil groove, which is cut away in the circumference direction so as to be shaped in a crescent form, is formed in the inner peripheral wall of the casing defining the oil sealing chamber. In the example described above, the oil groove is further formed on a bottom surface of the circumferential groove. The circumferential crescent-shaped oil groove is deepest at its center. The depth is gradually reduced from the center toward the both ends of the oil groove and corresponds to the surface of the inner peripheral wall at the both ends of the oil groove. No particular restriction is applied to the depth of the center of the oil groove, length of the crescent, and axial width dimension. The oil supply passage communicates with the approximate center of the oil groove to supply the lubricating oil. Also, the oil drain passage is formed in another portion of the oil sealing chamber to drain the lubricating oil to the casing or to the inner shaft oil passage of the rotational shaft.

It is preferable to form the oil groove and the oil supply passage in the oil sealing chamber so as to be apart from the oil drain passage in order for the lubricating oil to flow in the oil sealing portion for a longer time.

Specifically, it is preferable that the oil groove and the oil supply passage are formed at the inclined upper portion which is at a front side of the highest portion of the oil sealing chamber viewed from the rotating direction of the input shaft. Also, it is preferable that the oil drain passage is formed in the inclined lower portion located at substantially axisymmetric position relative to the oil supply passage.

The lubricating structure is configured so that the pressurized lubricating oil is supplied to the oil supply passage. For instance, it is preferable to provide the pump which is driven by the rotational shaft and supplies the pressurized lubricating oil to the oil supply passage.

The trochoid type or a vane type pump is employed and the pump is formed in the vicinity of the rotational shaft. For example, the pump is formed at an outer peripheral side or an end portion of the rotational shaft. In the trochoid type pump, the number of teeth is different between an inner rotor and an outer rotor. The inner and outer rotors are driven to rotate with the rotors eccentrically positioned. Thus, the spatial volume between teeth increases or decreases, and the pump functions by utilizing the changes. Namely, the pump suctions the lubricating oil from the casing in the process that the spatial volume increases to generate vacuum pressure and pumps the suctioned lubricating oil into the oil supply passage in the process that the spatial volume decreases to generate positive pressure. Similarly, in the vane type pump, a rotor provided with a plurality of vane members eccentrically rotates within a stator and thus the spaces between the vane members, which rotate being slidably contact with the stator, increases or decreases. The pump functions by utilizing the changes.

Next, the operation and effect of the above-mentioned lubricating structure of the invention will be described. When the rotational shaft is rotated, the pump starts to pump the lubricating oil suctioned from the casing to the oil supply passage. The pressurized lubricating oil is jetted out in the vicinity of the center of the crescent-shaped oil groove. Meanwhile, the air of the oil sealing chamber is biased by friction with the rotational shaft to flow in the rotational direction of the rotational shaft. The lubricating oil in the oil groove is biased by the airflow and flows to an end portion of the oil groove, which is located in the rotational direction, along the bottom surface thereof. Since the form of the bottom surface of the oil groove is crescent-shaped, the oil approaches the shaft center while flowing in the circumferential direction. Thus, the lubricating oil is come out in a direction having both the circumferential component and the component whose direction is toward the shaft center from the end portion of the oil groove and is guided to reach at the surface of the rotational shaft. Therefore, compared to the known structure, the larger amount of the oil lubricates in the vicinity of the sliding contact portion between the surface of the rotational shaft and the oil seal. Also, the lubricating oil flows in the wide angle range starting from the oil supply passage located in the inclined upper portion of the oil sealing chamber to the oil drain passage located in the inclined lower portion thereof to achieve the lubricating effect. Therefore, lubrication efficiency is good.

On the other hand, the lubricating oil accumulates in the position located lower relative to the oil drain passage in the oil sealing chamber. A part of the lubricating oil adheres to the rotational shaft, and thereby lubricates the position located higher than a surface of the accumulated lubricating oil. The accumulated lubricating oil adheres to the rotational shaft and achieves the lubricating effect immediately after the start of the operation. However, the viscosity of the accumulated oil could be resistance to the rotation of the rotational shaft. For this reason, the oil drain passage is not provided at a very high position of the oil sealing chamber.

The oil sealing chamber is provided at the one end of the oil sealing chamber and does not face the oil supply passage directly. Thus, the lubricating oil is biased by the airflow to be supplied slowly after being jetted out to the oil groove. Therefore, the oil seal is not subject to the influence of the direct jetting of the lubricating oil.

In the lubricating structure of the rotational shaft oil sealing portion according to the embodiment of the present invention, the crescent shaped oil groove is formed in the oil sealing chamber to supply the pressurized lubricating oil. Thus, the lubricating oil is guided so as to reach the rotational shaft from the bottom surface of the oil groove, and the larger amount of the lubricating oil is supplied in the vicinity of the sliding contact portion, compared to the known lubricating structure. Also, the oil supply passage is formed in the inclined upper portion of the oil sealing chamber and the oil drain passage is formed in the inclined lower portion which is located in the substantially axisymmetric position of the oil supply passage. Thus, the lubricating oil flows in the wide angle range to achieve the lubricating effect. Therefore, the lubricating efficiency is good. Further, the lubricating oil accumulates in the oil sealing chamber, and thus the lubricating effect is well achieved immediately after the start of the operation. The oil seal is not subject to the influence of the direct jetting of the lubricating oil.

The principles, of the preferred embodiments and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A lubricating structure of a rotational shaft oil sealing portion, comprising:
  a casing;
  a rotational shaft rotatably retained by the casing;
  an annular space defined between an inner surface of the casing and an outer surface of the rotational shaft;
  an annular oil seal retained by the casing at one axial end of the annular space and sealing a clearance between the casing and the rotational shaft so that an oil seal chamber is defined;
  the oil seal chamber bounded by the annular oil seal at one axial end of the oil seal chamber, an inner peripheral wall of the casing at an opposite axial end of the oil seal chamber, and the rotational shaft;
  an oil supply passage extending axially in the casing, the oil supply passage having one axial end receiving lubricating oil from the casing and terminating in the casing at an opposite axial end;
  an oil drain passage draining the lubricating oil to one of the casing and an oil passage formed inside of the rotational shaft from the oil seal chamber, the oil drain passage being formed at the inner peripheral wall of the casing;
  an oil groove formed at the inner peripheral wall of the casing by cutting away the inner peripheral wall of the casing into a crescent shape in a circumferential direction, the opposite axial end of the oil supply passage opening into and communicating with the oil groove at a circumferentially center portion of the oil groove;
  wherein pressurized lubricating oil is supplied to the oil groove via the oil supply passage;
  the pressurized lubricating oil is jetted out in the vicinity of the center of the crescent-shaped oil groove from the oil supply passage; and
  the oil drain passage is at an axisymmetric position relative to the oil supply passage of the oil seal chamber.

2. A lubricating structure of a rotational shaft oil sealing portion according to claim 1, wherein the oil groove and the oil supply passage are located at an inclined upper portion of the oil sealing chamber which is at a front side of a highest portion of the oil sealing chamber viewed from a rotating direction of the rotational shaft.

3. A lubricating structure of a rotational shaft oil sealing portion according to claim 2, further comprising a pump driven by the rotational shaft and supplying the pressurized lubricating oil to the oil supply passage.

4. A lubricating structure of a rotational shaft oil sealing portion according to claim 2, wherein the oil drain passage is located at an inclined lower portion of the oil sealing chamber viewed from a rotating direction of the rotational shaft.

5. A lubricating structure of a rotational shaft oil sealing portion according to claim 4, further comprising a pump driven by the rotational shaft and supplying the pressurized lubricating oil to the oil supply passage.

6. A lubricating structure of a rotational shaft oil sealing portion according to claim 1, further comprising a pump driven by the rotational shaft and supplying the pressurized lubricating oil to the oil supply passage.

* * * * *